United States Patent
Baddela et al.

(10) Patent No.: US 8,710,754 B2
(45) Date of Patent: Apr. 29, 2014

(54) DIMMABLE LED LIGHT FIXTURE HAVING ADJUSTABLE COLOR TEMPERATURE

(75) Inventors: Srinivasa M. Baddela, Streamwood, IL (US); John G. Serra, Pingree Grove, IL (US); Michael Z. Gielniewski, Bartlett, IL (US)

(73) Assignee: Juno Manufacturing LLC, Des Plaines, IL (US)

( * ) Notice: Subject to any disclaimer, the term of this patent is extended or adjusted under 35 U.S.C. 154(b) by 224 days.

(21) Appl. No.: 13/230,537

(22) Filed: Sep. 12, 2011

(65) Prior Publication Data

US 2013/0063035 A1  Mar. 14, 2013

(51) Int. Cl.
H05B 37/00 (2006.01)

(52) U.S. Cl.
USPC .......................... 315/192; 315/307; 315/312

(58) Field of Classification Search
USPC ............. 315/185 R, 186, 192, 291, 294, 297, 315/307, 308, 312, 360
See application file for complete search history.

(56) References Cited

U.S. PATENT DOCUMENTS

| | | | |
|---|---|---|---|
| 6,636,003 B2 | 10/2003 | Rahm et al. | |
| 7,038,399 B2 | 5/2006 | Lys et al. | |
| 7,288,902 B1 | 10/2007 | Melanson | |
| 7,358,679 B2 | 4/2008 | Lys et al. | |
| 7,459,864 B2 | 12/2008 | Lys | |
| 7,902,761 B2 | 3/2011 | Ang et al. | |
| 8,134,304 B2 * | 3/2012 | Hsu et al. | 315/291 |
| 8,354,804 B2 * | 1/2013 | Otake et al. | 315/308 |
| 8,384,305 B2 * | 2/2013 | Liao et al. | 315/294 |
| 2006/0202915 A1 | 9/2006 | Chikugawa | |
| 2008/0224631 A1 | 9/2008 | Melanson | |
| 2009/0195168 A1 * | 8/2009 | Greenfeld | 315/192 |
| 2010/0066266 A1 | 3/2010 | Huang et al. | |
| 2010/0289395 A1 | 11/2010 | Sun et al. | |
| 2012/0112651 A1 * | 5/2012 | King et al. | 315/224 |
| 2013/0057163 A1 * | 3/2013 | Sutardja et al. | 315/185 R |

FOREIGN PATENT DOCUMENTS

| | | |
|---|---|---|
| NL | 2002605 | 9/2010 |
| WO | 2006/018604 A1 | 2/2006 |
| WO | 2010/103480 A2 | 9/2010 |

OTHER PUBLICATIONS

International Search Report corresponding to co-pending International Patent Application Serial No. PCT/US2012/054838, European Patent Office, dated Nov. 23, 2012; (4 pages).
International Written Opinion corresponding to co-pending International Patent Application Serial No. PCT/US2012/054838, European Patent Office, dated Nov. 23, 2012; (5 pages).

* cited by examiner

Primary Examiner — Tung X Le
(74) Attorney, Agent, or Firm — Locke Lord LLP (57) ABSTRACT

Electronic circuitry for color-mixing in an LED light fixture during AC power dimming is disclosed to achieve adjustable color temperature. According to one embodiment, a dimmable LED light fixture has first, second, and third LED light sources, the first and second LED light sources producing white light, the third LED light source producing colored light, the LED driver configured to power the LED light sources by providing a single-channel variable-DC current source having two output terminals, and a current regulator for maintaining the current in the third LED light source path substantially constant as the LED driver output current is decreased when the AC power is reduced by the dimmer module, thereby altering the color of the light produced by the combination of the LED light sources.

23 Claims, 6 Drawing Sheets

DIMMABLE LED LIGHT FIXTURE HAVING ADJUSTABLE COLOR TEMPERATURE

TECHNICAL FIELD

The present invention generally relates to light emitting diode (LED) light fixtures, and more specifically pertains to electronic circuitry for color-mixing LEDs during dimming to achieve adjustable color temperature.

BACKGROUND OF THE INVENTION

The concept of color temperature is based on the comparison of a visible light source to that of an ideal black-body radiator. The color temperature (CT) scale assigns numerical values to the color emitted by the black-body source being heated, measured in degrees Kelvin (K). A black-body radiator is a theoretical material having perfect absorptivity at all wavelengths, making it the best possible emitter of thermal radiation.

One typically thinks of color temperature in terms of the "whiteness" versus "warmness" of the light source, i.e., "Daylight White" is 5000-6500 K, "Cool White" is 3500-5000 K, "Warm White" is 3500 K and below. Thermal light sources, such as incandescent lamp filaments, are called "incandescent radiators", and have a spectral power distribution (SPD) more uniformly spread throughout the visible spectrum. Light sources that are not incandescent radiators, which do not exhibit visible spectrum radiation at all wavelengths of the spectrum, are measured according to a "correlated color temperature" (CCT) scale. The CCT scale is adjusted according to human perception. White LEDs are measured using the CCT scale.

It is well-known that the color of the light produced by incandescent lamps changes when the lamp is dimmed. When the incandescent lamp is at full rated power, its correlated color temperature (CCT) is usually within the range of 2700 K-3300 K. However, when the incandescent lamp is dimmed, the CCT changes to as low as 1700 K, approximately the color of a match flame. To the human eye, the incandescent bulb appears to go from white to yellow, or to give a "warm glow" when dim. For many years, this inherent characteristic of incandescent bulbs has been seen as a feature used with AC dimmer modules to create a warm and cozy environment in restaurants, hotels, theaters, homes, etc.

LED light fixtures, which became popular in recent years because of their energy efficiency, give off light that does not normally change color when the fixture is dimmed. The white light from an LED light source has a constant CCT across the entire range of the AC dimmer module. Hence, even at lower light levels when dimmed, the white light given off by LED light fixtures has been perceived as unusual or unnatural, particularly when used in the aforementioned environments when trying to create a warming lighting effect. LED lighting manufacturers have been aware of this problem, but have yet to find a way to accurately duplicate the "warm glow" dimming characteristics of incandescent bulbs in a cost-effective manner.

One way to simulate the "warming with dimming" characteristic of an incandescent lamp with an LED light source is to optically mix white LEDs with amber (yellow/orange) LEDs, and control their currents in such a manner that the mixed color light from the LED combination changes from the 3000K white light to a more amber-yellow-white color with dimming. Traditionally, LED systems performing mixing of two or more colored LEDs use individual drivers controlling each colored LED separately, or use a single driver designed to have two or more separate output channels, where each output channel is controlled individually within the driver. U.S. Pat. No. 7,288,902 to Melanson, incorporated by reference herein, describes such a circuit having multiple light sources to vary the color temperatures in response to changing dimming levels. The light source driver provides individual drive currents to each light source in response to the selected dimming level in order to achieve the desired color temperature. At least a two-channel LED driver must be used to power an amber LED in addition to a white LED array in this circuit.

The use of individual LED drivers, or a multi-channel output LED driver, to control each LED colored array, has several disadvantages. First, and most importantly, is the additional cost. As LED lighting becomes more prevalent, designers seek the most cost-effective alternatives. Second, complexity and reliability issues demand the simplest solutions. Custom multiple-channel LED drivers designed for specific types of dimmers are not a preferred lighting solution. Third, if the warming-while-dimming function could be accomplished inside the LED light engine using only the two inputs provided by a single-channel LED driver, the LED light engine could be used with most any LED driver, and dimmable with most any AC dimmer module.

A need, therefore, exists for an LED circuit arrangement and LED light fixture that can be used with a single-channel variable-DC LED driver to simulate the color temperature changes of incandescent lamps as dimming levels change.

SUMMARY OF THE INVENTION

Aspects of the present disclosure are directed to electronic circuitry and devices for color-mixing LEDs during dimming to achieve adjustable color temperature. According to one embodiment, a dimmable LED light fixture is disclosed, which comprises first and second LED light sources, the first LED light source producing light visibly different in color from that of light produced by the second LED light source; an LED driver having two input terminals configured to be connected to a dimmable AC power source having a dimmer module, the LED driver configured to power the LED light sources by providing a single-channel variable-DC power output requiring no more than two electrical connections to the LED light sources, the first and second LED light sources coupled in parallel across the LED driver output; and a current regulator coupled in series with only the second LED light source, whereby the current in the second LED light source remains substantially constant as the LED driver DC output power is decreased when the AC power is reduced by the dimmer module, thereby altering the color of the light produced by the combination of the first and second LED light sources.

According to another embodiment, a dimmable LED light engine circuit is disclosed, having first and second LED light sources, the first LED light source producing light visibly different in color from that of light produced by the second LED light source; and further having a third LED light source producing light substantially the same color as that produced by the first LED light source, the third LED light source connected in series with the parallel combination of both the first and second LED light sources.

According to another embodiment, a dimmable LED light fixture is disclosed having first, second, and third LED light sources, the first and second LED light sources producing white light, the third LED light source producing colored light, each LED light source having first and second terminals; an LED driver having two input terminals configured to be connected to a dimmable AC voltage produced by a dimmer module, the LED driver configured to power the LED light sources by providing a single-channel variable-DC current source having two output terminals, the first output terminal connected to the first LED light source first terminal, the second and third LED light source first terminals connected to the first LED light source second terminal, and a current regulator having first and second terminals, its first terminal connected to the third LED light source second terminal, the current regulator second terminal and the second LED light source second terminal connected to the LED driver second output terminal, whereby the single-channel variable-DC-current provided by the LED driver passes through the first LED light source series current path and is split between the second and third LED light source parallel current paths, and whereby the current in the third LED light source path remains substantially constant as the LED driver output current is decreased when the AC voltage is reduced by the dimmer module, thereby altering the color of the light produced by the combination of the LED light sources.

A dimmable LED light engine is also disclosed, having first and second input terminals adapted for connection to an LED driver, the LED driver configured to be connected to an AC power dimmer module, the LED driver configured to power the LED light sources by providing a single-channel variable-DC power output requiring no more than two electrical connections to the LED light sources, the dimmable LED light engine comprising: first and second LED light sources coupled in parallel across the first and second input terminals, the first LED light source producing light visibly different in color from that of light produced by the second LED light source; a current regulator coupled in series with only the second LED light source, whereby the current in the second LED light source remains substantially constant as the LED driver DC output power is decreased when the AC power is reduced by the dimmer module, thereby altering the color of the light produced by the combination of the first and second LED light sources. The dimmable LED light engine may further comprise a third LED light source producing light substantially the same color as that produced by the first LED light source, the third LED light source connected in series with the parallel combination of both the first and second LED light sources.

According to one aspect of the disclosure, the dimmable LED light fixture does not need to have an individual LED driver for each LED light source, or have a multi-channel output LED driver, to control the white and amber LED arrays separately. The present design can be implemented with any type of off-the-shelf dimmable LED driver that performs amplitude dimming. In this way, an existing LED light fixture can be retrofit with the LED light engine according to the present disclosure, depending upon the LED voltages involved, without having the LED light fixture replaced. This allows the customer to retrofit an existing LED light fixture with an LED light engine that accomplishes the warming-while-dimming feature.

Aspects of the present disclosure further provide for the use of a microcontroller to provide more precise control of the current regulator, which, in turn, provides more accurate simulation of the characteristic black-body curve of an incandescent lamp during dimming.

Another aspect of the disclosure provides for accurate color temperature correction at very low dim levels to closely simulate the incandescent lamp dimming curve, and to avoid color shifts during the lower dimming range upon an increase in AC power.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The following Figures depict certain illustrative embodiments of the invention in which like-reference numerals refer to like elements. These depicted embodiments are to be understood as illustrative of the invention and not as limiting in any way.

DETAILED DESCRIPTION

Figures 1, 2:
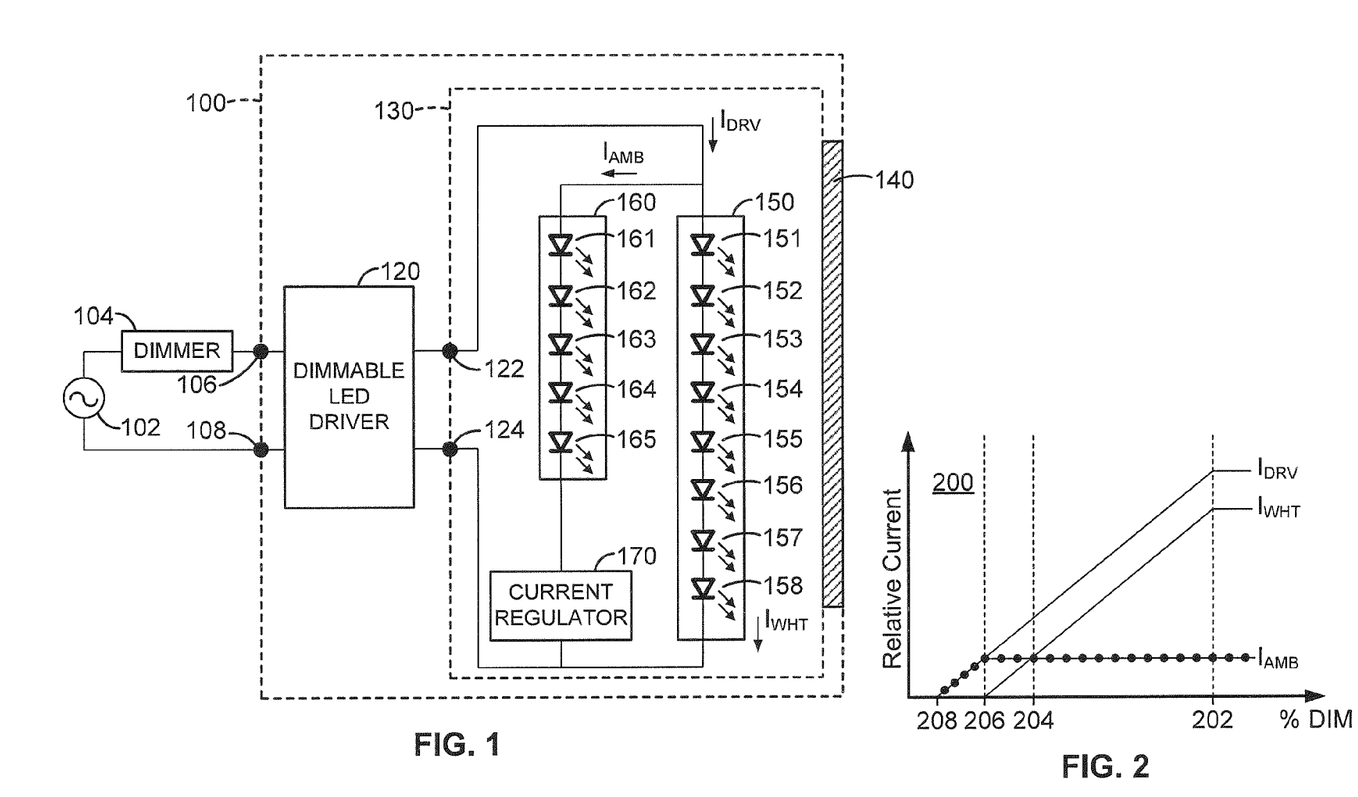
FIG. 1 is an electrical block diagram of a dimmable LED light fixture in accordance with an embodiment of the present disclosure.
FIG. 2 is a graphical representation of the relative LED currents in the circuit of FIG. 1 versus the percentage of dimming provided by the dimmer module.

Referring now to FIG. 1, an electrical block diagram of dimmable LED light fixture 100 is shown. Fixture 100 is connected to AC power source 102, which is 120 VAC in the United States. However, the invention is not restricted to any particular AC power source voltage. AC power dimmer module 104 is shown connected in series with AC power source 102 in this block diagram, although dimmer module 104 may be connected in a different manner depending upon the type of dimmer module, as discussed below. Either way, AC power dimmer module 104 provides a dimmable AC power signal to the two input terminals, 106 & 108, of LED light fixture 100.

As known in the art, an AC power dimmer module is typically coupled in series with an AC power source as shown in FIG. 1. Generally, there are different classes of dimmer operation: phase dimming, analog dimming, and digital dimming. With phase dimming, the most prevalent type in residential lighting is forward-phase dimming (also known as leading-edge phase dimming), since it only requires two AC wires. The other type of phase dimming, reverse-phase dimming (also known as trailing-edge phase dimming), requires three wires to the dimmer. Either way, LED drivers are available to convert the AC phase-dimmable power to DC power. Analog dimmers, such as 0-to-10 VDC dimmers, are also known, although they require two additional wires to implement. These types of dimmers are typically found in commercial environments. Finally, digital dimming, such as Digital Addressable Lighting Interface (DALI), C-BUS (trademark of Schneider Electric), and others, can also be used to control the power output of the LED driver. In any case, no matter which type of AC dimmer configuration is used, as long as the corresponding dimmable LED driver is configured to produce a single variable-DC current source output over 2 wires, then the LED engines disclosed herein provide the numerous advantages described above with that type of AC power dimmer module.

The dimmable AC power signal is provided to LED driver 120, which is typically located inside LED fixture 100. The LED driver converts the AC power signal to a single-channel variable-DC power output available at the two input terminals, 122 & 124, of the LED light engine 130. Optics 140 are also typically associated with fixture 100 to perform the function of mixing the white LED light with the colored LED light, as is known in the art.

Typical LED drivers convert AC power line voltage to either a constant DC voltage source output or a constant DC current source output. Most LEDs perform better when driven with a constant current source because the color of the LEDs can change with small variations in driving current. If the input power to the LED driver is decreased, for example by a forward-phase dimmer, then the LED driver current source output will also decrease proportionally. This variable-DC current source output from the LED driver is normally used to control the dimming of white LED arrays. There are a wide variety of current source LED drivers available, as they are normally chosen for the specific application and the type of LEDs used in the LED light engine. For example, an LED driver that could be used with the embodiment shown in FIG. 1 is the EXM055 LED driver available from Exclara, Inc. of Santa Clara, Calif. Numerous other compatible LED drivers are available from Philips Lighting Electronics, Somerset, N.J., and Magtech Industries, Las Vegas, Nev.

Note that only two electrical connections, 122 & 124, are used between LED driver 120 and LED light engine 130. Inside LED light fixture 100, this exhibits itself as only two wires going to the LED light engine module. This 2-wire driver output configuration is standard for a wide variety of single-color light engine modules on the market today. However, in accordance with the various aspects of the present disclosure, the feature of warming-while-dimming can also be accomplished using only two electrical connections to the LED light engine module.

LED light engine 130 includes a first LED light source 150, such as a white LED array, a second LED light source 160, such as an amber LED array, and a current regulator 170. The current regulator 170 and amber LED array 160 are connected in series such that the current regulator limits the amount of current flowing through the amber LED array. Current regulator 170 is not connected in series with white LED array 150. Instead, white LED array 150 is connected directly in parallel across the output of LED driver 120 at input terminals 122 & 124. Similarly, the series combination of amber LED array 160 and current regulator 170 are also directly connected in parallel across the output of LED driver 120 at input terminals 122 & 124. As will be seen below, this creates a parallel path for the LED driver source current I(drv) to flow into both LED arrays, one path I(wht) being through white LED array 150, the other path I(amb) being through amber LED array 160 and current regulator 170.

As will be explained further below, only the current in white LED array 150 I(wht) is reduced as dimming begins, since the current in amber LED 160 I(amb) stays constant due to current regulator 170 and due to the parallel current path design of the circuit. In other words, the current through the white LED array I(wht) is reduced by the difference between I(drv) and I(amb). As the LED driver source current I(drv) is reduced by dimming, the ratio of I(wht)/I(amb) changes disproportionately due to the current regulator 170. Hence, the CCT of the combination of white LEDs and amber LEDs, when mixed via optics 140, have less white component and more amber component when dimmed. A more complete description of the current limiting effect on these LED arrays during dimming will be provided below in connection with FIG. 2.

In the preferred embodiment, LED light source 150 is a white LED array comprised of eight individual LEDs 151, 152, 153, 154, 155, 156, 157, and 158, connected in series as shown in FIG. 1. Similarly, second LED light source 160 is an amber LED array, comprised of five individual LEDs 161, 162, 163, 164, 165. However, as used herein, the term LED may refer to a single light emitting diode device having single or multiple dies. Similarly, the term LED light source may refer to any LED-based source of light, regardless of packaging. Hence, an LED light source may include one or a plurality of individual LEDs, depending upon the particular application and/or the desired color effect. In this embodiment, white LED array 150 comprises an array of eight individual white LEDs connected in series having a 3000 K CCT of approximately 850 lumens when driven at 470 mA, while amber LED array 160 comprises an array of five individual amber LEDs connected in series having a wavelength of 590 nm at approximately 40 lumens when driven at 50 mA. Of course, other LEDs having different characteristics can be used. An alternative embodiment of the LED light engine 130 could be implemented with a single, high-power, chip-on-board (COB) white LED array with multiple individual yellow/amber LEDs surrounding the white COB. Still further, the LED light engine can be implemented as a single COB array, wherein both the white and amber LEDs are constructed on one board, such as in concentric rings patterns. In other embodiments, the colored LEDs may be a combination of red and yellow LEDs as will be described below, or combinations of red, blue, and green LEDs. Numerous other LED colors and packaging variations can be implemented with the embodiments disclosed herein.

Current regulator 170 can also be implemented in various ways. The simplest way to implement the current regulator is using a single resistor connected in series with amber LED array 160. Since LED driver 120 applies a variable-DC constant current source output to the input terminals 122 & 124 of the LED circuit arrangement shown, and since the parallel arrangement of the white LED array and the amber LED array fixes the voltage across a current limiting resistor 170 to a specified voltage, the resistor serves as a current regulator. However, performance of a single series resistor as a constant current regulator is not optimal, since the current control is based upon on the voltage drop across the LEDs, which may vary from LED array to LED array. Any minor difference in voltage drop across the LEDs will cause a slight difference in current levels in the LED light engines in different fixtures, which may be seen as slight variations in LED light fixture colors. Of course, a single resistor also introduces some power loss.

In the preferred embodiment, current regulator 170 is implemented using a current limiting linear regulator integrated circuit. An example of one such integrated circuit current regulator would be the LT3092 200 mA 2-terminal programmable current source available from Linear Technology Corporation of Milpitas, Calif. It requires only two resistors to set an output current between 0.5 mA and 200 mA. Another example, as used in various embodiments, would be the Infineon BCR421, from Infineon Technologies AG, München, Germany. Discrete circuit components could also be used to implement a linear current regulator circuit. A linear regulator would also introduce some power loss. Alternatively, a third current regulator implementation would be to use a current limiting switch-mode regulator. Similar to a switch-mode power supply, a switch-mode regulator would improve the power efficiency. However, switch-mode regulators are typically more costly.

FIG. 2 shows a graph 200 and the relative LED currents in the circuit of FIG. 1 (vertical axis) versus the percentage of dimming power provided by the AC dimmer module (horizontal axis). At 100% full power (i.e., 100% dimming) represented in FIG. 2 at point 202 on the horizontal axis, the LED driver source current I(drv) is equal to the sum of the current I(wht) through the white LED array 150 and the current I(amb) through the amber LED array 160. Current regulator 170 maintains the current I(amb) at a constant level through amber LED array 160, since it allows only a preset maximum amount of current to flow through that parallel path. The remainder of the source current I(drv) must flow through the other parallel current path via the white LED array as I(wht). In other words, as can be seen from the circuit diagram of FIG. 1, I(drv)=I(wht)+I(amb).

As the power from the AC dimmer module is reduced during dimming, the LED source current is reduced, as shown by the I(drv) current line decreasing toward the left. Notice that the amber LED array current I(amb) remains constant going to the left of point 202. The current through the white LED array I(wht) is reduced by the difference between I(drv) and I(amb). Hence, I(wht)=I(drv)−I(amb). Since the ratio of I(wht)/I(amb) current is now changed, the CCT of the combination of the white LEDs and amber LEDs, when mixed via optics 140, will have less white component and the same amount of amber component. This produces the desired warming-while-dimming effect of an incandescent lamp, now simulated by an LED light fixture. In this embodiment, the LED light engine operates within the CCT range of approximately 1800K-3200 K.

Note that the current I(wht) through the white LED array 150 is substantially greater than the current I(amb) through the amber LED array 160. As the dimming begins at point 202, only the current I(wht) in the white LED array is reduced, since the current I(amb) in the amber LED array stays constant due to the current regulator 170. At point 204, the two currents I(wht) and I(amb) are equal, and the CCT of the LED light engine would have both white and amber components. Upon further dimming to point 206, the current I(wht) through the white LED array becomes zero, yet the current I(amb) through the amber LED array has not yet been reduced to zero until it reaches point 208 on the graph, where the LED driver current I(drv) becomes zero. This provides no contribution of white light from the white LED array in the low-dimming region between points 206 and 208. Hence, just above this 0% power (i.e., just above 0% dimming) point 208 on the horizontal axis, the combined LED light output has turned completely amber, and may appear abnormally orange in color. In certain applications, dimming to this low level may also create a noticeable shift in color upon startup or shutdown as compared to the entire dimming range.

Figure 3:
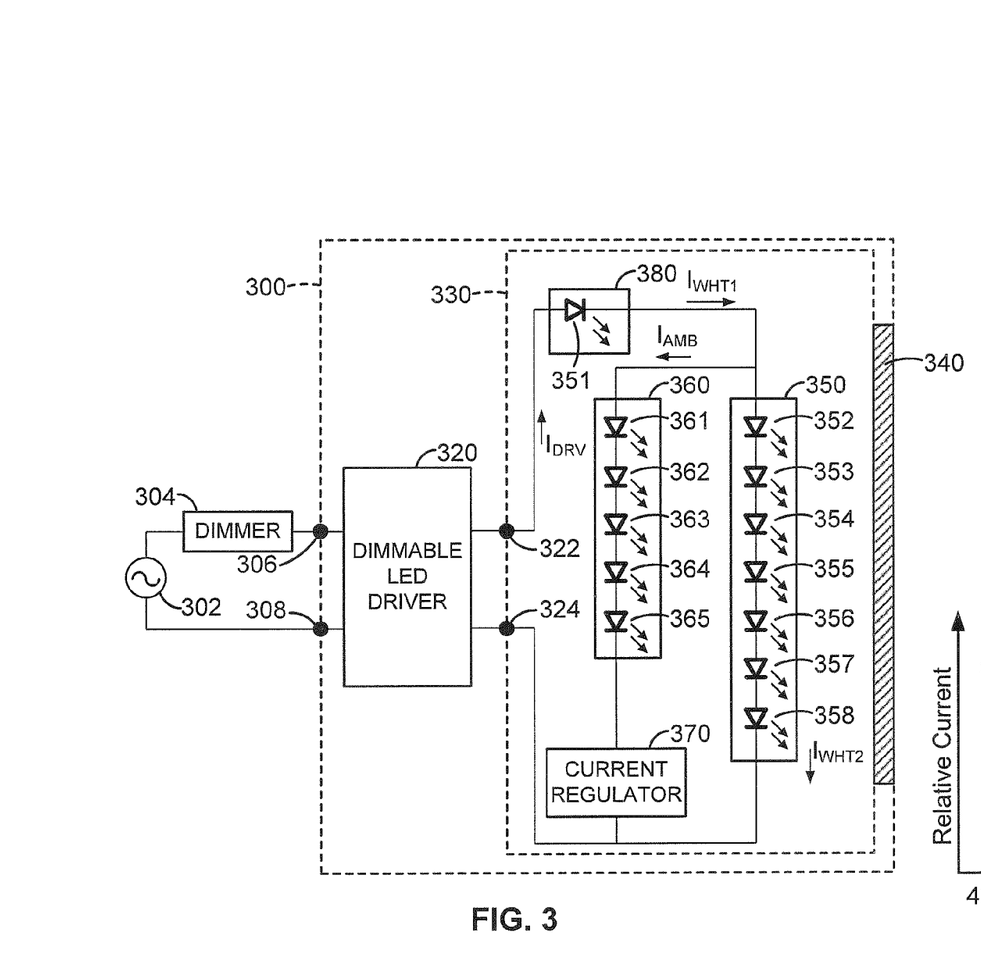
FIG. 3 is an electrical block diagram of another embodiment of a dimmable LED light fixture in accordance with the present disclosure.

FIG. 3 illustrates another embodiment of a dimmable LED light fixture in accordance with the present disclosure. This embodiment is similar to the embodiment shown in FIG. 1, and like-numbered components in the 300 series of FIG. 3 are similar to like-numbered components in the 100 series of FIG. 1. For example, AC power source 302 is connected through AC power dimmer module 304, at input terminals 306 & 308, to dimmable LED driver 320. For a complete description of the similar components in FIG. 3, refer to the like-numbered components of the 100 series in FIG. 1.

FIG. 3 includes a separate LED light source 380, comprised of a single white LED 351, connected in series with the parallel combination of both the white LED light source 350, comprised of white LEDs 352-358, and the colored LED light source 360, comprised of amber LEDs 361-365. As before, current regulator 370 is connected in series with the colored LED light source 360 current path. In this manner, constant current source LED driver 320 provides variable-DC drive current I(drv) from its output at terminal 322, through the first white LED 351 having current I(wht1), which then splits between the parallel current paths I(wht2) and I(amb) as shown. These parallel current paths are combined and returned to LED driver at terminal 324. The use of the separate white LED light source 380 improves the performance of the LED light engine 330 to allow for a greater range of dimming without turning completely amber at lower dim levels. It also improves the startup and shutdown performance during dimming, as will be seen below.

Figure 4:
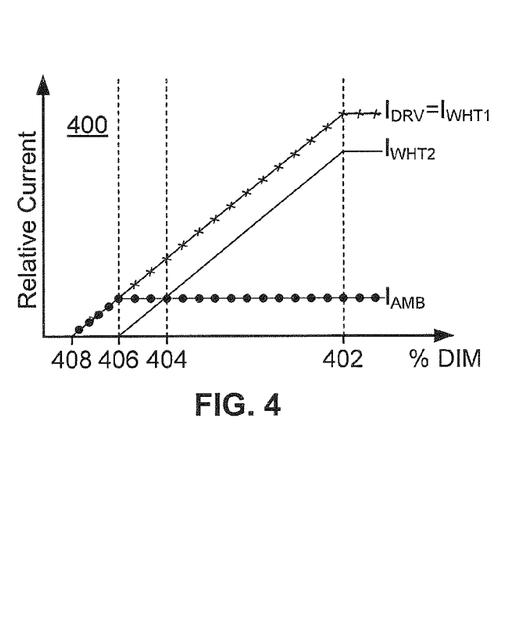
FIG. 4 is a graphical representation of the relative LED currents in the circuit of FIG. 3 versus the percentage of dimming provided by the dimmer module.

Graph 400 of FIG. 4 shows the relative LED currents in the circuit of FIG. 3. In this embodiment, the LED driver source current I(drv) is equal to the current I(wht1) through the first white LED 380. Other than that, the graph is substantially the same as that described previously in FIG. 2 at high power levels. At point 402, current regulator 370 maintains the current I(amb) through the amber LED array 360 at a predetermined level, which is insignificant compared to the contribution of current through the white LED array 350 at full power. As can be seen from the circuit diagram of FIG. 3, I(drv)=I(wht1)=I(wht2)+I(amb).

Upon dimming, the LED driver current I(drv) is reduced, and the current through the white LEDs I(wht1) and I(wht2) are proportionally reduced. As before, the current I(wht2) through white LED array 350 is reduced by the difference between I(drv) and I(amb), or I(wht2)=I(drv)−I(amb). Again, the CCT of the combination of the white LEDs and amber LEDs is reduced to provide the desired warming-while-dimming effect.

However, the addition of white LED 380 in series provides a significant advantage at the lower dimming ranges. As dimming continues to the left of point 404, where the two currents I(wht2) and I(amb) are equal, and further towards point 406, where the current I(wht2) through the primary white LED array becomes zero, notice that there is still white light available from the series-connected white LED 380 current path I(wht1), mixed with the amber LED array 360 current path I(amb). Hence, there is now a contribution of white light in the region between points 406 and 408 to prevent the LED light engine from generating completely amber light just above the 0% power (i.e., just above 0% dimming) point 408. Of course, the number and type of LEDs in LED light source 380 must be properly chosen. In this embodiment, LED light source 380 comprises one of the same individual white LEDs 351 as used in the LED array embodiment of FIG. 1, and LED light source 350 comprises seven of those same white LEDs 352-358. LED light source 360 comprises the same five amber LEDs 361-365 used in the LED array embodiment of FIG. 1. These LED numbers and types can be optimized to further adjust the CCT at the low-end range of the dimmer.

Figure 5:
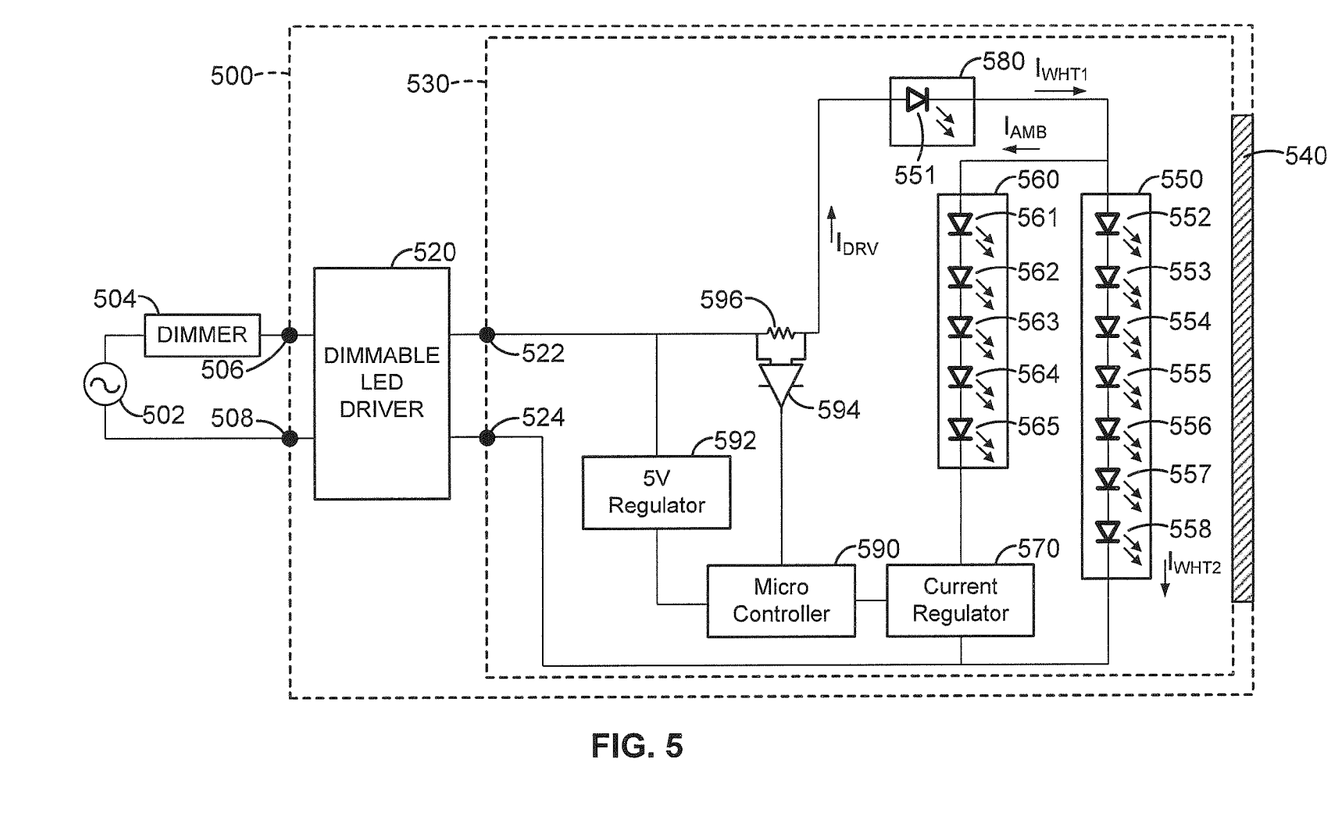
FIG. 5 is an electrical block diagram of an alternative embodiment of a dimmable LED light fixture utilizing a microcontroller for controlling the current regulator.

FIG. 5 is an alternative embodiment showing the LED light fixture circuitry utilizing a microcontroller for controlling the current regulator. Again, this embodiment is similar to the embodiments shown in FIGS. 1 and 3, and like-numbered components in the 500 series of FIG. 5 are similar to like-numbered components in the 100 series of FIG. 1 and the 300 series of FIG. 3. For a complete description of the similar components in FIG. 5, refer to the like-numbered components of the prior Figures.

In FIG. 5, LED light engine 530 is again connected to LED driver 520 via only two electrical connections, 522 & 524, and operates via a single-channel variable-DC current source input. Even though a microcontroller is used, no additional wiring or signals or other intelligence are required to be passed from the dimmer through the LED driver to the microcontroller. This feature becomes extremely advantageous when a customer desires to have his existing LED fixtures upgraded to include the warming-while-dimming feature, which can be accomplished by retrofitting new LED light engine modules without replacing all new LED fixtures.

A microcontroller 590 can be added to LED light engine 530 to provide more dynamic control of current regulator 570, which, in turn, provides closer simulation of the characteristic dimming curve of an incandescent lamp during dimming. In this embodiment, the microcontroller outputs a control signal to the input of the current regulator to dynamically and precisely control the current I(amb) through the amber LED array 560. In order for the microcontroller to precisely determine variations in the LED driver source current I(drv), a current sensing resistor 596 is inserted in series with the current source driver path I(drv), and an operational amplifier 594 is used to provide the measured voltage drop to the microcontroller. Microcontroller 590 is powered by a 5 VDC regulator 592, which derives its power from the LED driver current source output terminal 522. In the preferred embodiment, microcontroller 590 is an Infineon XC836, which is an 8-bit microcontroller with on-chip EEPROM, on-chip RAM, and A/D Converter (ADC).

Figure 6:
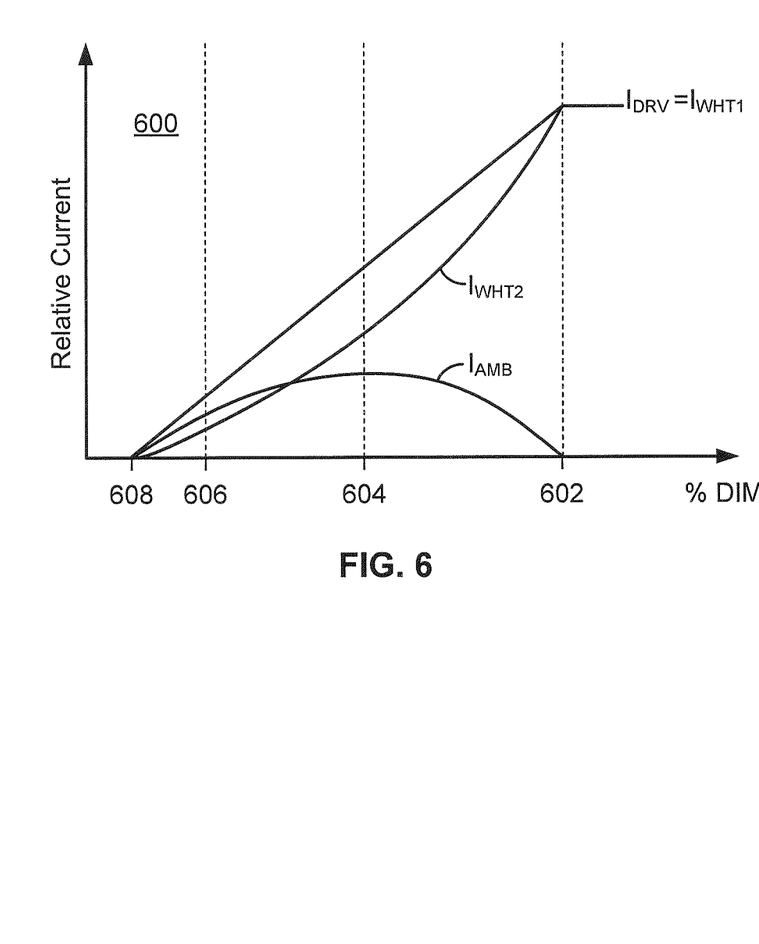
FIG. 6 is a graphical representation of the relative LED currents in the circuit of FIG. 5 versus the percentage of dimming provided by the dimmer module.

FIG. 6 is a graph 600 of the relative LED currents in the circuit of FIG. 5 versus the percentage of dimming provided by the dimmer module. As can be seen at point 602 representing full power (100% dimming), the LED driver current I(drv) is at its maximum, as is the current I(wht1) through the series-path white LED light source 580. Microcontroller 590 has turned off the current regulator 570 at this point, such that no current I(amb) is flowing through amber LED array 560. Since, the current I(wht2) in the parallel-path white LED array 550 is shared with the current I(amb) in the parallel-path amber LED array 560, and since as before, I(wht2)=I(drv)−I(amb), then I(wht2) is also at a maximum.

As the percentage dimming increases at point 604 on the graph, microcontroller 590 senses (via sensing resistor 596 and amplifier 594) that the source current I(drv) provided by LED driver 520 has decreased, and thus provides a control signal to current regulator 570 to increase the current through amber LED array 560. Due to the parallel path circuit configuration, any increase in the amount of current through the amber LED array will be subtracted from that provided to white LED array 550 current path I(wht2). This is shown in FIG. 6 as the difference between the top line I(drv)=I(wht1) and the I(wht2) current at point 604. As the percentage dimming further increases toward point 606, the microcontroller continues to provide a control signal to current regulator 570 that continuously changes the amount of current through the amber LED array to follow any desired curve programmed in the memory of the microcontroller, until zero drive current I(drv) is reached at point 608. The graph 600 shows that microcontroller 590 provides a very accurate and smooth warming-while-dimming effect.

Hence, the use of a microcontroller allows the LED light engine 530 to more closely simulate the characteristic dimming curve of the incandescent lamp during dimming. Another advantage is that the microcontroller can be used for color calibration, to minimize any unit-to-unit color variations between LEDs. Furthermore, the microcontroller can be programmed to implement LED temperature measurements and perform temperature compensation, as well as LED-lifetime characteristic compensation. Of course, the microcontroller itself draws current, so the system is less efficient, more costly, and will increase the lower dimming starting point because of the current drawn by the microcontroller. These are all design trade-offs that would be taken into account when choosing to implement this embodiment.

Figure 7:
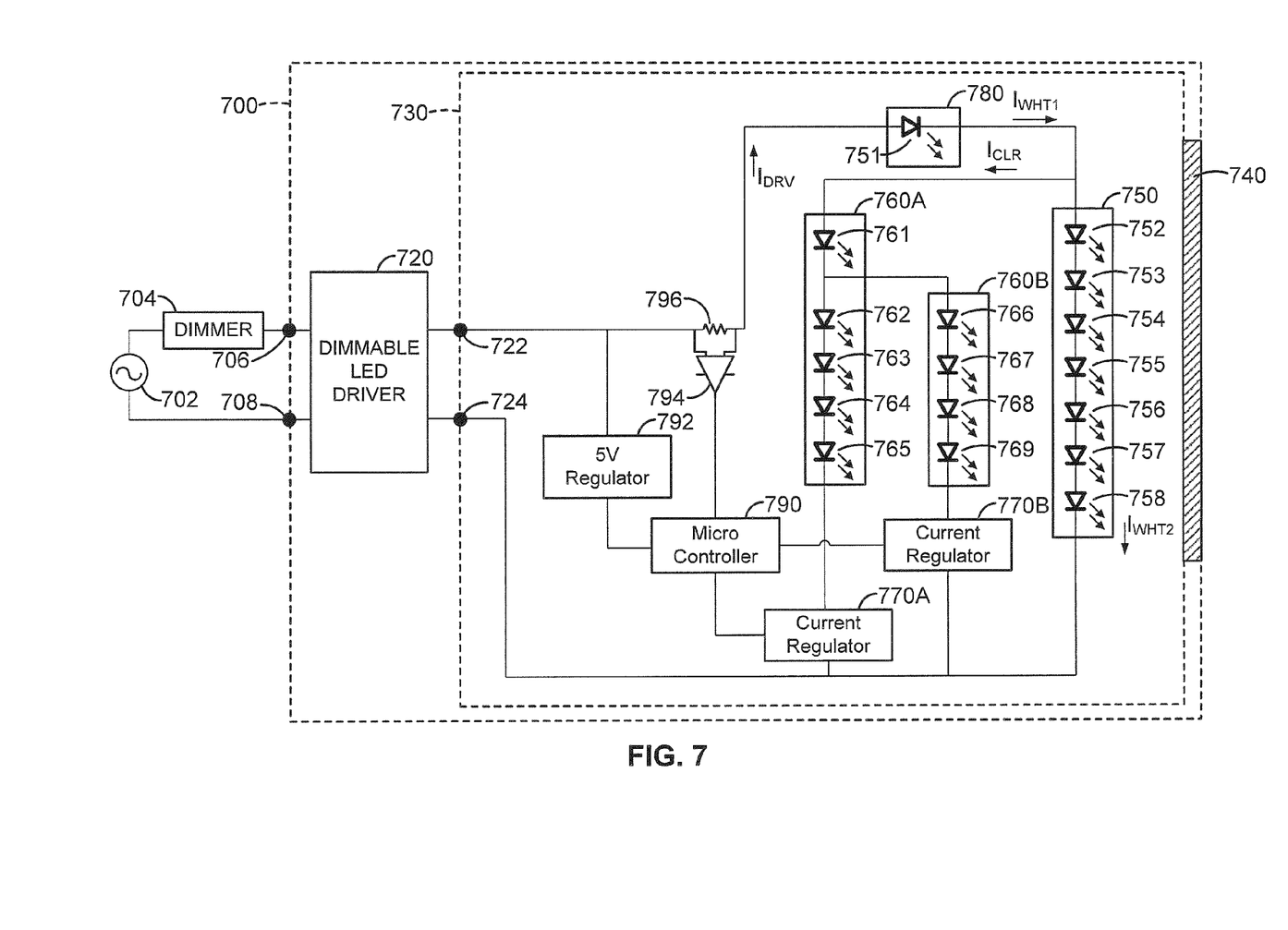
FIG. 7 is an electrical block diagram of a dimmable LED light fixture in accordance with another embodiment of the present disclosure.

FIG. 7 is still another alternative embodiment, similar to the microcontroller embodiment of FIG. 5, but utilizing two different color-correction LED arrays. Again, numerous components of this embodiment are similar to the previous embodiments, and have like-numbered components in the 700 series.

In FIG. 7, LED light engine 730 includes a series white LED light source 780, a primary white LED array 750, and two colored LED arrays 760A & 760B, that are current regulated as shown. In this embodiment, the series LED light source 780 comprises a single white LED 751, while LED array 750 comprises a string of seven white LEDs 752-758. The first colored LED array 760A is a green LED array, regulated by current regulator 770A. In this embodiment, a string of five green LEDs 761-765 is used. The second colored LED array 760B is a red LED array, regulated by current regulator 770B. In this embodiment, a string of four red LEDs 766-769 is used. Note the particular wiring configuration between the colored strings, in that the first red LED 766 is connected after the first green LED 761 as shown in FIG. 7. Hence, the entire amount of the current I(clr) to the colored LED arrays 760 passes through green LED 761 before being split to the two colored LED arrays 760A and 760B. This was done to improve the color-mixing performance at lower dimming levels.

As in the previous embodiment, the use of a microcontroller permits an LED light engine to more closely simulate the characteristic black-body curve of the incandescent lamp during dimming. However, this is still difficult using a single amber LED array for color temperature correction. Hence, the multi-color configuration of LED light engine 730 addresses this problem, and allows the designer to truly simulate incandescent lamp dimming and very closely replicate its black-body curve characteristics, since two or more, independently controlled, color LED arrays are used for color temperature correction under microcontroller control. In the embodiment shown in FIG. 7, primary white LED light source 750 is warmed-while-dimming using the combination of green LED array 760A and red LED array 760B. These colors could be substituted or augmented with other red, green, and blue LEDs to be able to place the color temperature anywhere on the black-body curve.

Figure 8:
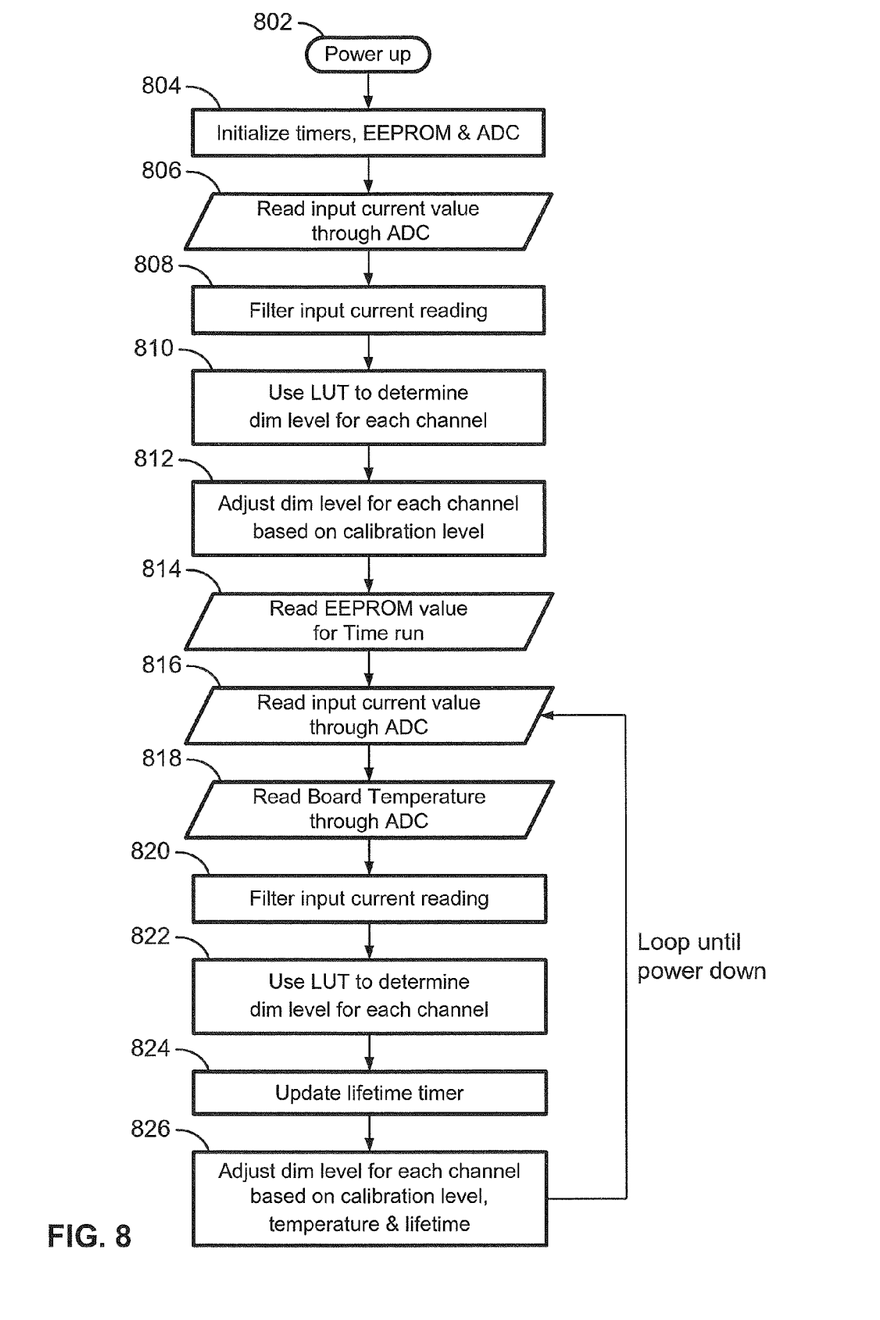
FIG. 8 is a flowchart showing the operational steps performed by the microcontroller of FIGS. 5 and 7 in generating the dim control signal for the current regulator.

FIG. 8 is a flowchart showing the steps performed by the microcontroller 590 of FIG. 5 and/or the microcontroller 790 of FIG. 7 in generating the control signal for each current regulator. The overall purpose of the microcontroller program is to interpret the amplitude modulation of the DC current source output provided by the LED driver, and to provide the control signals to the current regulators to simulate the warming-while-dimming characteristics. Note that all the logic for this function is being performed within the LED light engine module, based on information provided from the dimmable LED driver 2-wire output. Hence, the LED light engine 530 or 730 is capable of performing the warming-while-dimming function independent of the type of AC dimmer located before the dimmable LED driver.

The following description provides an example of a microcontroller program that can be used with the various embodiments described herein. As will be understood by those skilled in the art, certain options or features may not be used or may not be available in all embodiments, but are described below for the sake of completeness. Of course, other microcontroller programs and techniques may also be used.

In step 802, the microcontroller first powers up when the 5 V regulator receives sufficient operating voltage from the LED driver. In step 804, the microcontroller initializes its onboard timers, EEPROM, and analog-to-digital converter (ADC). Next, in step 806, it reads the input of the I(drv) driver current value, as sensed by the sensing resistor provided through the operational amplifier, and fed through the microcontroller's onboard ADC. In step 808, the microcontroller filters this input current reading to make sure that any unwanted noise on the measurement gets filtered out.

In step 810, the microcontroller uses the filtered current reading as an index to its lookup table (LUT) to determine the dim level for each channel, i.e., for each current regulator-controlled color LED array current path. The LUT can be stored in the EEPROM or flash memory of the microcontroller. This lookup table was previously generated for each type of LED light engine configuration, and tells the microcontroller how much current is required for each colored LED array at the various dimming levels to provide the proper CCT for that LED light engine. Based on this information, in step 812, the microcontroller provides a control signal to each current regulator to adjust the dim level for each channel. This signal is further adjusted based on an initial calibration level, which can be programmed into the microcontroller to adjust for color & lumen variations between the LEDs.

In step 814, the microcontroller reads the EEPROM to determine the number of hours that the light engine has been operating. This "time run" value will be used later in connection with the "lifetime timer", as explained below.

In step 816, the microcontroller again reads the input of the I(drv) driver current value as sensed by the sensing resistor through the ADC, as was previously done in step 806. If the LED light engine module has a temperature sensor, the microcontroller also reads the board temperature through the ADC in step 818. As known in the art, LED color may vary with temperature, so if the board temperature is known, the microcontroller can perform temperature compensation.

As was done earlier, the microcontroller filters the input current reading in step 820 to ensure that any unwanted noise gets rejected. Again, the microcontroller uses the filtered current reading as an index to the lookup table (LUT) to determine the dim level for each channel in step 822.

In step 824, the microcontroller updates its lifetime timer, to keep track of the LED life. As known in the art, LEDs typically do not burn out over their lifetime, but instead tend to decrease in brightness. Hence, by keeping track of LED life, the microcontroller can compensate for this decreased brightness by adjusting the current through the LEDs.

Finally, in step 826, the microcontroller outputs a control signal to each current regulator to adjust the dimming level for each channel based on the calibration level, the temperature, and the lifetime. The microcontroller program then continuously loops back to step 816 to read another input current value, which may be different now if the user has varied the AC dimmer. In this manner, the microcontroller continuously and accurately simulates the warming-while-dimming performance of an incandescent bulb by controlling the current through one or more current regulators in the LED light engine.

While specific embodiments and particular implementations of the present disclosure have been illustrated and described herein, it should be appreciated that the present disclosure is not so limited, and that various other embodiments, implementations, and variations may be apparent to those of skill in the art. This disclosure is intended to cover any and all other embodiments, implementations, and variations that fall within the true spirit and scope of the description.

What is claimed is:

1. A dimmable LED light fixture comprising:
   first and second LED light sources, the first LED light source producing light visibly different in color from that of light produced by the second LED light source;
   an LED driver having two input terminals configured to be connected to a dimmable AC power source having a dimmer module, the LED driver configured to power the LED light sources by providing a single-channel variable-DC power output requiring no more than two electrical connections to the LED light sources such that current from the LED driver flows into the first and second LED light sources via one of the two electrical connections, the first and second LED light sources coupled in parallel across the LED driver output;
   a current regulator coupled in series with only the second LED light source and with the other of the two electrical connections; and
   a third LED light source producing light substantially the same color as that produced by the first LED light source, the third LED light source connected in series with the parallel combination of both the first and second LED light sources;
   whereby the current in the second LED light source remains substantially constant as the LED driver DC output power is decreased when the AC power is reduced by the dimmer module, thereby altering the color of the light produced by the combination of the first and second LED light sources.

2. A dimmable LED light fixture comprising:
   first, second, and third LED light sources, the first and second LED light sources producing white light, the third LED light source producing colored light, each LED light source having first and second terminals;
   an LED driver having two input terminals configured to be connected to a dimmable AC voltage produced by a dimmer module, the LED driver configured to power the LED light sources by providing a single-channel variable-DC current source having two output terminals, the first output terminal connected to the first LED light source first terminal, the second and third LED light source first terminals connected to the first LED light source second terminal, and
   a current regulator having first and second terminals, its first terminal connected to the third LED light source second terminal, the current regulator second terminal and the second LED light source second terminal connected to the LED driver second output terminal,
   whereby the single-channel variable-DC-current provided by the LED driver passes through the first LED light source series current path and is split between the second and third LED light source parallel current paths, and whereby the current in the third LED light source path remains substantially constant as the LED driver output current is decreased when the AC voltage is reduced by the dimmer module, thereby altering the color of the light produced by the combination of the LED light sources.

3. The dimmable LED light fixture of claim 2, wherein the first LED light source comprises a single white LED.

4. The dimmable LED light fixture of claim 3, wherein the second LED light source comprises a series string of at least seven white LEDs.

5. The dimmable LED light fixture of claim 4, wherein the third LED light source comprises a series string of at least five amber LEDs.

6. The dimmable LED light fixture of claim 2, further comprising a microcontroller configured to provide a signal to the current regulator for dynamically changing the current in the third LED light source.

7. The dimmable LED light fixture of claim 6, further comprising a current sensing circuit configured to provide a signal to the microcontroller for determining the variations in the LED driver source current.

8. A dimmable LED light engine having first and second input terminals adapted for connection to an LED driver, the LED driver configured to be connected to an AC power source having a dimmer module, the LED driver configured to power LED light sources by providing a single-channel variable-DC power output requiring no more than two electrical connections to the LED light sources, the dimmable LED light engine comprising: first and second LED light sources coupled in parallel across the first and second input terminals, the first LED light source producing light visibly different in color from that of light produced by the second LED light source;
a third LED light source connected in series with the parallel combination of both the first and second LED light sources;
a current regulator coupled in series with only the second LED light source,
whereby the current in the second LED light source remains substantially constant as the LED driver DC output power is decreased when the AC power is reduced by the dimmer module, thereby altering the color of the light produced by the combination of the first and second LED light sources.

9. The dimmable LED light engine of claim 8, wherein the LED driver is further configured to power the LED light engine by providing a single-channel variable-DC current source.

10. The dimmable LED light engine of claim 8, the third LED light source producing light substantially the same color as that produced by the first LED light source.

11. The dimmable LED light engine of claim 8, further comprising optics for mixing light produced by the LED light sources.

12. The dimmable LED light engine of claim 8, further comprising a microcontroller configured to provide a signal to the current regulator for dynamically changing the current in the second LED light source.

13. A dimmable LED light engine having first and second input terminals adapted for connection to an LED driver, the LED driver configured to be connected to a dimmable AC voltage produced by a dimmer module, the LED driver further configured to power the LED light engine by providing a single-channel variable-DC current source having two output terminals, the dimmable LED light engine comprising:
first, second, and third LED light sources, the first and second LED light sources
producing white light, the third LED light source producing colored light, each LED light source having first and second terminals, the first LED light source first terminal connected to the LED light engine first input terminal, the second and third LED light source first terminals connected to the first LED light source second terminal, and
a current regulator having first and second terminals, its first terminal connected to the third LED light source second terminal, the current regulator second terminal and the second LED light source second terminal connected to the LED light engine second input terminal,
whereby the single-channel variable-DC-current provided by the LED driver is split between the second and third LED light source parallel current paths, and whereby the current in the third LED light source path remains substantially constant as the LED driver output current is decreased when the AC voltage is reduced by the dimmer module, thereby altering the color of the light produced by the combination of the LED light sources.

14. The dimmable LED light engine of claim 13, wherein the first LED light source comprises a single white LED.

15. The dimmable LED light engine of claim 14, wherein the second LED light source comprises an array of at least seven white LEDs.

16. The dimmable LED light engine of claim 15, wherein the third LED light source comprises an array of at least five colored LEDs.

17. The dimmable LED light engine of claim 13, further comprising a microcontroller configured to provide a signal to the current regulator for dynamically changing the current in the third LED light source.

18. The dimmable LED light engine of claim 17, further comprising a current sensing circuit configured to provide a signal to the microcontroller for determining the variations in the LED driver source current.

19. A dimmable LED light fixture comprising:
first and second LED light sources, the first LED light source producing light visibly different in color from that of light produced by the second LED light source;
an LED driver having two input terminals configured to be connected to a dimmable AC power source having a dimmer module, the LED driver configured to power the LED light sources by providing a single-channel variable-DC power output requiring no more than two electrical connections to the LED light sources such that current from the LED driver flows into the first and second LED light sources via one of the two electrical connections, the first and second LED light sources coupled in parallel across the LED driver output;
a current regulator coupled in series with only the second LED light source and with the other of the two electrical connections;
a third LED light source connected in series with the parallel combination of both the first and second LED light sources; and
a microcontroller configured to provide to the current regulator a signal configured to dynamically change the current in the second LED light source;
whereby the current in the second LED light source remains substantially constant as the LED driver DC output power is decreased when the AC power is reduced by the dimmer module, thereby altering the color of the light produced by the combination of the first and second LED light sources.

20. The dimmable LED light fixture of claim 19, further comprising: a current sensing circuit configured to provide a signal to the microcontroller for determining the variations in the LED driver source current.

21. The dimmable LED light fixture of claim 20, wherein the microcontroller is programmed to perform compensation for variations in temperature.

22. A dimmable LED light fixture comprising:
first and second LED light sources, the first LED light source producing light visibly different in color from that of light produced by the second LED light source;
an LED driver having two input terminals configured to be connected to a dimmable AC power source having a dimmer module, the LED driver configured to power the LED light sources by providing a single-channel variable-DC power output requiring no more than two electrical connections to the LED light sources such that current from the LED driver flows into the first and second LED light sources via one of the two electrical connections, the first and second LED light sources coupled in parallel across the LED driver output;
a current regulator coupled in series with only the second LED light source and with the other of the two electrical connections,
a microcontroller configured to provide a signal to the current regulator for dynamically changing the current in the second LED light source; and
a current sensing circuit configured to provide a signal to the microcontroller for determining the variations in the LED driver source current, wherein the microcontroller is configured to use the signal from the current sensing circuit and a predetermined curve to control the signal to the current regulator such that the current outputted by the LED driver follows the predetermined curve;
whereby the current in the second LED light source remains substantially constant as the LED driver DC output power is decreased when the AC power is reduced by the dimmer module, thereby altering the color of the light produced by the combination of the first and second LED light sources.

23. The dimmable LED light fixture of claim 22, wherein the microcontroller is programmed to sense, using the signal from the current sensing circuit, a decrease in the current provided by the LED driver and to thereby increase the current to the second LED light source and decrease the current to the first LED light source.

* * * * *